J. MARSH.
Churn Dasher.
No. 7,527.
Patented July 30, 1850.
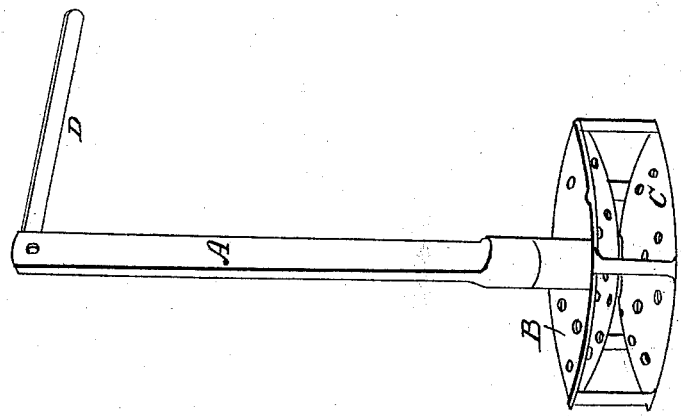

UNITED STATES PATENT OFFICE.

JOSEPH MARSH, OF PETERSBURG, ILLINOIS.

IMPROVEMENT IN CHURN-DASHERS.

Specification forming part of Letters Patent No. 7,527, dated July 30, 1850.

*To all whom it may concern:*

Be it known that I, JOSEPH MARSH, of Petersburg, Menard county, and State of Illinois, have invented a new and Improved Churn-Dasher, which dasher when used in the churn and put in motion will by its peculiar construction make butter in a shorter time and with less labor than any other now in use.

The nature of my invention consists in two convex pieces of tin or other suitable material perforated and placed on the upright, as shown at A in the accompanying drawing, which when put in motion creates a suction of atmosphere through the milk (when put into a churn) that excels any improvement in churns of ancient or modern invention that has yet been exhibited or used.

My dasher is used in a churn like or similar to the plain old-fashioned churns so long used by farmers generally. It may be propelled by a lever, as shown at D in the drawing before referred to, or by simply raising the dasher A up and pushing it down to its assigned limit. The convex pieces of tin, as shown at B and C, are or may be six inches in diameter, and the several holes in the same about three-quarters of an inch in diameter, the several holes in B made to cover about half of the several holes in C, as described in B and C in the drawing.

My churn, in which the dasher before described is used, is some twenty inches in height, with said dasher fitting close therein, or as much so as it can, not to create friction.

The churn, as before stated, is not unlike the ordinary churns used, except that it is straight on the inside instead of cone-shaped.

What I claim as my invention, and desire to secure by Letters Patent, is—

The double-concave perforated discoid churn-dasher, as herein described and represented, and for the purposes set forth.

JOSEPH MARSH.

Witnesses:
 D. A. BROWN,
 W. Z. SPRANSE.